(12) United States Patent
Ma et al.

(10) Patent No.: US 10,393,916 B2
(45) Date of Patent: Aug. 27, 2019

(54) PREDICTING WATER HOLDUP MEASUREMENT ACCURACY OF MULTIPHASE PRODUCTION LOGGING TOOLS

(71) Applicant: SCHLUMBERGER TECHNOLGY CORPORATION, Sugar Land, TX (US)

(72) Inventors: Shouxiang Mark Ma, Dhahran (SA); Dmitry Eskin, Edmonton (CA); Wael Abdallah, Dhahra (SA); Shawn David Taylor, Edmonton (CA)

(73) Assignees: SCHLUMBERGR TECHNOLOGY CORPORATION, Sugar Land, TX (US); SAUDI ARABIAN OIL COMPANY, Dhahran (SA)

( * ) Notice: Subject to any disclaimer, the term of this patent is extended or adjusted under 35 U.S.C. 154(b) by 393 days.

(21) Appl. No.: 15/070,453

(22) Filed: Mar. 15, 2016

(65) Prior Publication Data
US 2017/0269258 A1   Sep. 21, 2017

(51) Int. Cl.
*G01V 5/10* (2006.01)
*G01V 99/00* (2009.01)

(52) U.S. Cl.
CPC .............. *G01V 5/10* (2013.01); *G01V 99/005* (2013.01)

(58) Field of Classification Search
None
See application file for complete search history.

(56) References Cited

U.S. PATENT DOCUMENTS

| 2007/0108380 A1* | 5/2007 | Poe ..................... E21B 47/1015 |
| | | 250/269.6 |
| 2009/0204346 A1 | 8/2009 | Xie |
| 2009/0308601 A1* | 12/2009 | Poe, Jr. .................. E21B 47/06 |
| | | 166/250.01 |

(Continued)

FOREIGN PATENT DOCUMENTS

WO   WO2013090875 A1   6/2013

OTHER PUBLICATIONS

Albertin, I., et. al., The Many Facets of Pulsed Neutron Cased-Hole Logging. Oilfield Review Summer 1996.*

(Continued)

*Primary Examiner* — J. E. Schoenholtz

(57) ABSTRACT

In one possible implementation, a computer-readable tangible medium includes instructions that direct a processor to access one or more wellbore properties and a plurality of well fluid properties. Instructions are also present that direct the processor to access a distance between a proposed location of an inlet to a multiphase production logging tool and an emulsion generation location in a wellbore. Further instructions instruct the processor to predict a drop size distribution of emulsified water in the well fluid at the proposed location of the inlet to the multiphase production logging tool. Additional instructions instruct the processor to compute an estimated error in water holdup detected by the multiphase production logging tool based on the drop size distribution, and recommend deployment of a pulsed neutron logging tool in the wellbore when the estimated error in the water holdup is above a preset threshold.

20 Claims, 7 Drawing Sheets

(56) References Cited

U.S. PATENT DOCUMENTS

2012/0119076 A1   5/2012   Edwards et al.
2012/0166157 A1   6/2012   Whittaker

OTHER PUBLICATIONS

Apple II computer system with computer readable media, i.e. 3.5 and 5.25 inch floppy drives, circa 1983 downloaded from URL<https://apple2history.org/history/ah07/#03> on Mar. 26, 2019 (Year: 1983).*

Albertin, I., et. al., The Many Facets of Pulsed Neutron Cased-Hole Logging. Oilfield Review Summer 1996. (Year: 1996).*

Liao, Y. et al., "A Literature Review on Mechanisms and Models for the Coalescence Process of Fluid Particles", Chemical Engineering Science, 65(10), pp. 2851-2864.

International Search Report and Written Opinion issued in International Application No. PCT/US2017/015694 dated May 11, 2017, 10 pages.

Ahmad et al., Integrated Solution for Emulsion Diagnosis in Horizontal Production Logs, SPE 166532, SPE Annual Technical Conference and Exhibition, Sep. 30-Oct. 2, 2013, New Orleans, Louisiana, USA. 15 pages.

* cited by examiner

PREDICTING WATER HOLDUP MEASUREMENT ACCURACY OF MULTIPHASE PRODUCTION LOGGING TOOLS

BACKGROUND

In an effort to improve well performance, well operators often endeavor to monitor water holdup during oil production in a well. Water holdup can be measured with downhole multiphase production logging tools having one or more rotating spinners for determining a velocity distribution of fluids flowing through the well, along with one or more electrical probes for measuring holdups of various fluid phases in the well (such as oil, gas, water, etc.).

Electrical probes on multiphase production logging tools can discriminate between water and hydrocarbons by measuring the electrical resistivity of each phase. However, in some instances water droplets below certain diameters may not be detected. In such cases, alternate technologies can be deployed to measure the small water droplets, though this can often involve multiple runs downhole, which can be expensive.

SUMMARY

In one possible implementation, a computer-readable tangible medium includes instructions that direct a processor to access one or more wellbore properties and a plurality of well fluid properties. Instructions are also present that direct the processor to access a distance between a proposed location of an inlet to a multiphase production logging tool and an emulsion generation location in a wellbore. Further instructions instruct the processor to predict a drop size distribution of emulsified water in the well fluid at the proposed location of the inlet to the multiphase production logging tool. Additional instructions instruct the processor to compute an estimated error in water holdup detected by the multiphase production logging tool based on the drop size distribution and recommend deployment of a pulsed neutron logging tool in the wellbore when the estimated error in the water holdup is above a preset threshold.

In another possible implementation, a computer-readable tangible medium includes instructions that direct a processor to calculate a water droplet size distribution in a well fluid at a proposed location of an inlet to a multiphase production logging tool in a wellbore. Instructions are also present that direct the processor to recommend use of a pulsed neutron logging tool along with the multiphase production logging tool in the wellbore when a volume fraction of water droplets having a diameter below a preset diameter in the well fluid at the proposed location of the inlet is above a preset threshold.

In yet another possible implementation, a computer-readable tangible medium includes instructions that direct a processor to calculate a water droplet size distribution in a well fluid at a proposed location of an inlet to a multiphase production logging tool in a conduit using a population balance model. Instructions are also present to direct the processor to recommend use of the multiphase production logging tool in the conduit when a volume fraction of water droplets in the fluid having a diameter below an operational sensitivity of the multiphase production logging tool is below a preset threshold at the location of the inlet to the multiphase production logging tool.

This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

Additionally, some examples discussed herein may involve technologies associated with the oilfield services industry in a downhole environment. It will be understood however that the techniques and technologies of the subject disclosure may also be useful in a wide range of scenarios outside of a downhole environment. For example, various aspects of the subject disclosure may be useful at, for instance, the wellhead for conduit flow (such as pipe flow), and/or at various locations for surface multiphase flow meter measurement prediction. In other possible embodiments, various aspects may be useful, for example, in a plant such as a gas-oil separator plant (GOSP) where water-oil can be formed.

It will also be understood that the techniques and technologies of the subject disclosure may be useful in a wide range of industries outside the oilfield services sector, including for example, mining, geological surveying, etc. For instance, in one possible implementation, techniques of the subject disclosure can be used in conjunction with various oil-water conduit flows (such as pipe flows) in plants such as chemical plants.

As described herein, various techniques and technologies can be used to evaluate if a measurement tool, such as a multiphase production logging tool, will produce sufficiently accurate results for a logging job before the tool is deployed in a conduit environment (such as a pipe environment, a wellbore etc.). For example, an evaluation can be made to see if the accuracy of water holdup measurements made by the measurement tool can be expected to be of an acceptable quality.

In one possible implementation, such evaluations can be conducted by modeling the flow conditions in a pipe and/or wellbore to predict a volume percentage of water droplets with a size below an operational sensitivity (i.e. a detection threshold) of the measurement tool. If this volume percentage is high enough to produce measurement errors in the measurement tool above a preset threshold, the deployment of another measurement tool better suited to the flow conditions in the wellbore can be recommended.

Example System(s) and/or Technique(s)

Figure 1:
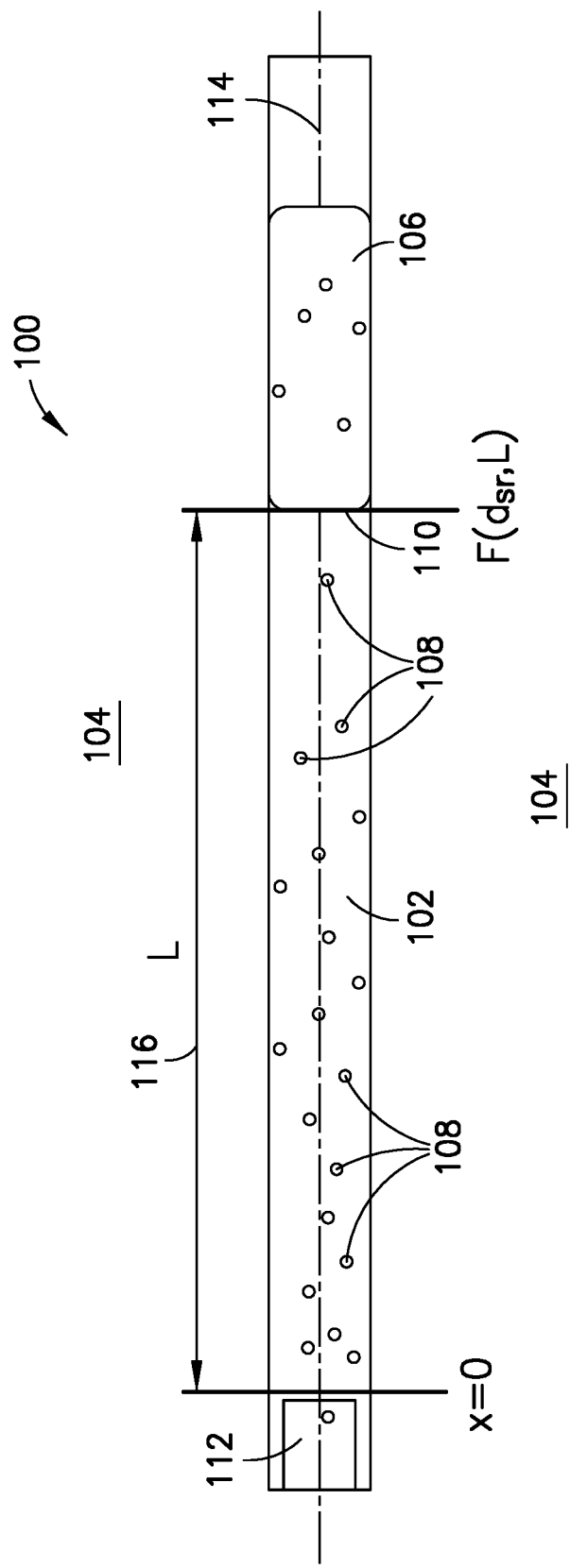
FIG. 1 illustrates an example well environment in which embodiments of the subject disclosure can be employed.

FIG. 1 illustrates a well environment 100 in which embodiments of the subject disclosure can be employed. Well environment 100 can be onshore or offshore and include a borehole 102 formed in a subsurface formation 104 by drilling in a manner that is well known, including directional drilling. Wellbore 102 can be horizontal, vertical, diagonal, or any combination thereof. Moreover, wellbore 102 can be cased, open, or any combination thereof, and can have deployed therein any downhole equipment known in the art including, for example, sensors, measurement tools, completions equipment, artificial lift pumps, etc.

A measurement tool 106 can be suspended within borehole 102. Measurement tool 106 can include any tool used in a pipe and/or wellbore environment to measure flow conditions in a conduit, such as wellbore 102, including, but not limited to, a wireline tool, a logging tool, a combination tool, etc. In one possible implementation, measurement tool 106 can include a multiphase production logging tool.

Measurement tool 106 can include a variety of functionality configured to measure flow conditions in a conduit, such as wellbore 102. This can include, for example, one or more rotating spinners for determining a velocity distribution of fluids flowing through borehole 102. The functionality of measurement tool 106 can also include one or more electrical probes for measuring holdups of various fluid phases present in wellbore 102, including oil, gas, water, etc.

In one possible implementation, droplets 108 of a material, such as water, may be present in a fluid flow in borehole 102. Droplets 108 may be present in a variety of sizes, with some droplets 108 being small enough to elude an operational sensitivity of measurement tool 106 such that they are not detected, and/or are detected/measured incompletely by measurement tool 106. For example, in one possible implementation, some multiphase production logging tools may not be able to detect/measure droplets 108 with diameters of less than 200 micrometers.

In one possible embodiment, failure of electrical probes on measurement tool 106 to adequately detect droplets 108 below the operational sensitivity of measurement tool 106 can occur due to several reasons. For instance, droplets 108 can be so small that they follow flow streamlines in borehole 102 and therefore do not come into contact with the electrical probes. Alternately, or additionally, a contact area of the electrical probes can be so small that reliable resistivity measurements of small droplets 108 don't occur.

When enough droplets 108 with sizes below the operational sensitivity of measurement tool 106 are present in wellbore 102, the measurements produced by measurement tool 106 associated with flow conditions in borehole 102 can be susceptible to error. In some instances, this error may be negligible. In other instances, this error may rise to and exceed a threshold acceptable to a well operator. In such instances, an alternative measurement approach involving the deployment of a second tool may be desirable in order to better detect/measure the droplets 108 in wellbore 102 that are too small to be measured by measurement tool 106.

In one possible implementation, a model of flow conditions in wellbore 102 can be constructed before measurement tool 106 is placed in wellbore 102. From this model, a volume fraction of droplets 108 with a size below the operational sensitivity of measurement tool 106 can be calculated at a point of entry of fluid flow in borehole 102 into an inlet 110 of measurement tool 106. If the volume fraction of droplets 108 with a size below the operational sensitivity of measurement tool 106 is great enough to create an error in the measurements of measurement tool 106 exceeding a preset threshold (i.e. a preset tolerance acceptable to a well operator, for example) then a second tool can be recommended for deployment in wellbore 102. The second tool (such as, for example, a pulsed neutron logging tool (PNLT)) can be chosen based on its capability of detecting droplets 108 with a size below the operational sensitivity of measurement tool 106. The second tool can be recommended for deployment in wellbore 102 in place of, or in addition to, measurement tool 106.

By formulating such a model, multiple runs to install various tools in borehole 102 to accurately measure flow conditions can be avoided. Instead, the tools desirable to measure the flow conditions in wellbore 102 to an acceptable level of quality can be installed in a single run. In one possible implementation, the model of flow conditions which can be used to estimate the measurement error of measurement tool 106 can be based on mathematical modeling of dispersed phase (water) size distribution evolution along wellbore 102.

In one possible embodiment, a droplet size distribution of water droplets 108 at inlet 110 of measurement tool 106 can be predicted using a Population Balance Modeling (PBM) approach. Once determined, the droplet size distribution can be utilized to determine a volume fraction of droplets 108 having a size below the operational sensitivity of measurement tool 106. This volume fraction can in turn be used to calculate an expected error of measurement tool 106 in measuring water holdup in wellbore 102. As noted above, if this error is below an acceptable preset threshold, measurement tool 106 can be used on its own in borehole 102. Alternately, if the expected error of measurement tool 106 in measuring water holdup in wellbore 102 is above an acceptable preset threshold, a recommendation can be issued to deploy measurement tool 106 and an additional device, such as a PNLT device, in borehole 102.

In one possible implementation, Population Balance Modeling can be used to compute an evolution of a droplet size distribution of droplets 108 along wellbore 102 from an emulsion source 112 to inlet 110 of measurement tool 106. This can include computing an evolution of sizes of droplets 108 caused by their breakup and coalescence in a fluid flow in wellbore 102. Emulsion source 112 can include anything, or combination of things, known in the art capable of stimulating well fluids in borehole 102 to form an emulsion, such as, for example, a downhole choke, an artificial lift pump (such as an electric submersible pump, a progressing cavity pump, etc.), one or more completions elements, an inlet from formation 104 to wellbore 102, etc.

In one possible implementation, fluid flow in wellbore 102 can be turbulent, such as for example, when wellbore 102 is part of a high rate well. In such an instance, both the breakup and the coalescence processes for droplets 108 in the fluid flow can be driven by turbulence.

In one possible aspect, turbulence in a pipe flow (such as in wellbore 102) can be characterized by an energy dissipation rate equal to power spent on flow transport per unit mass. Thus the Advection-Diffusion-Population Balance Equation for a pipe flow (such as in wellbore 102) can be formulated in the two-dimensional steady-state form as follows:

$$u(r)\frac{\partial N(\upsilon, x, r)}{\partial x} = \frac{1}{r}\frac{\partial rE(d, r)\frac{\partial N(\upsilon, x, r)}{\partial r}}{\partial r} + \left(\frac{dN(\upsilon, x, r)}{dt}\right)_{PB} \quad (1)$$

where E(d, r) is the turbulent diffusivity of the droplet 108 of size d at the distance r from the pipe axis (such as an axis 114 of wellbore 102), N(υ, x, r) is the concentration by number of droplets of the volume υ at the pipe cross-section (such as the cross-section of wellbore 102) with the axial coordinate x at the distance r from the pipe axis, u(r) is the flow velocity at the distance r from the pipe axis, $$\left(\frac{dN(\upsilon, x, r)}{dt}\right)_{PB} = D + B$$

is the population balance term determining the droplet size distribution change with time due to breakup and coalescence, B is the birth rate of droplets 108 of the volume υ that is governed by both breakup of larger droplets 108 and coalescence of smaller droplets 108, D is the death rate of droplets 108 of the volume υ that is determined by both breakup and coalescence with droplets 108 of the same or other sizes.

In one possible aspect, the velocity distribution u(r) for a turbulent flow in a pipe can be rather accurately described by a logarithmic profile. The turbulent diffusivity of a droplet 108 in a pipe flow E(d, r) can also be calculated with a reasonable accuracy by a semi-empirical approach.

In one possible implementation, an interesting issue can be the calculation of the terms B and D. There are a number of well-established theories for both the breakup and the coalescence processes, which can be employed for modeling. For example, in one possible aspect, Eq. 1 can be solved by setting an initial condition, which represents the droplet size distribution at a cross-section of wellbore 102 where the emulsion was formed, such as, for example, at emulsion source 112. This initial condition can be set to reflect the reality of the emulsion generation, such as emulsion formation due to flow from emulsion source 112. A completion design can also be a factor affecting the initial droplet size distribution.

In one possible aspect, due to a high intensity of droplet coalescence leading to emulsion breakage, solution of Eq. 1 at a large distance from the emulsion generation cross-section (such as for example, emulsion source 112) can be expected to be weakly dependent on the initial condition.

In one possible implementation, as a result of the solution of Eq. 1, the droplet size distribution at inlet 110 of measurement tool 106, located at a distance L (denoted as element 116 in FIG. 1) from the emulsion generation cross-section (such as for example, at emulsion source 112) can be obtained. In one possible aspect, the solution can be represented as the integral droplet size distribution by volume F(d, L) averaged over the cross-section of wellbore 102 characterized by the axial coordinate x=L (where x=0 at the outlet of emulsion source 112 and x=L at inlet 110 of measurement tool 106). The function F(d, L) can thus be used to determine a volume fraction of droplets 108, the sizes of which are smaller than d. Thus, if the droplet size indicating the operational sensitivity (i.e. the resolution minimum) $d_s$ for measurement tool 106 is introduced, then the error of the water holdup detection in measurement tool 106 caused by smallness of water droplets 108 can be estimated to be equal to $F(d_s, L)$.

It will be understood that even though well environment 100 has been described in terms of a downhole well, well environment 100 can include any environment in which measurement tool 106 can be deployed in a conduit (such as wellbore 102, a pipe at a wellhead, a pipe in a surface plant, etc.).

Figure 2:
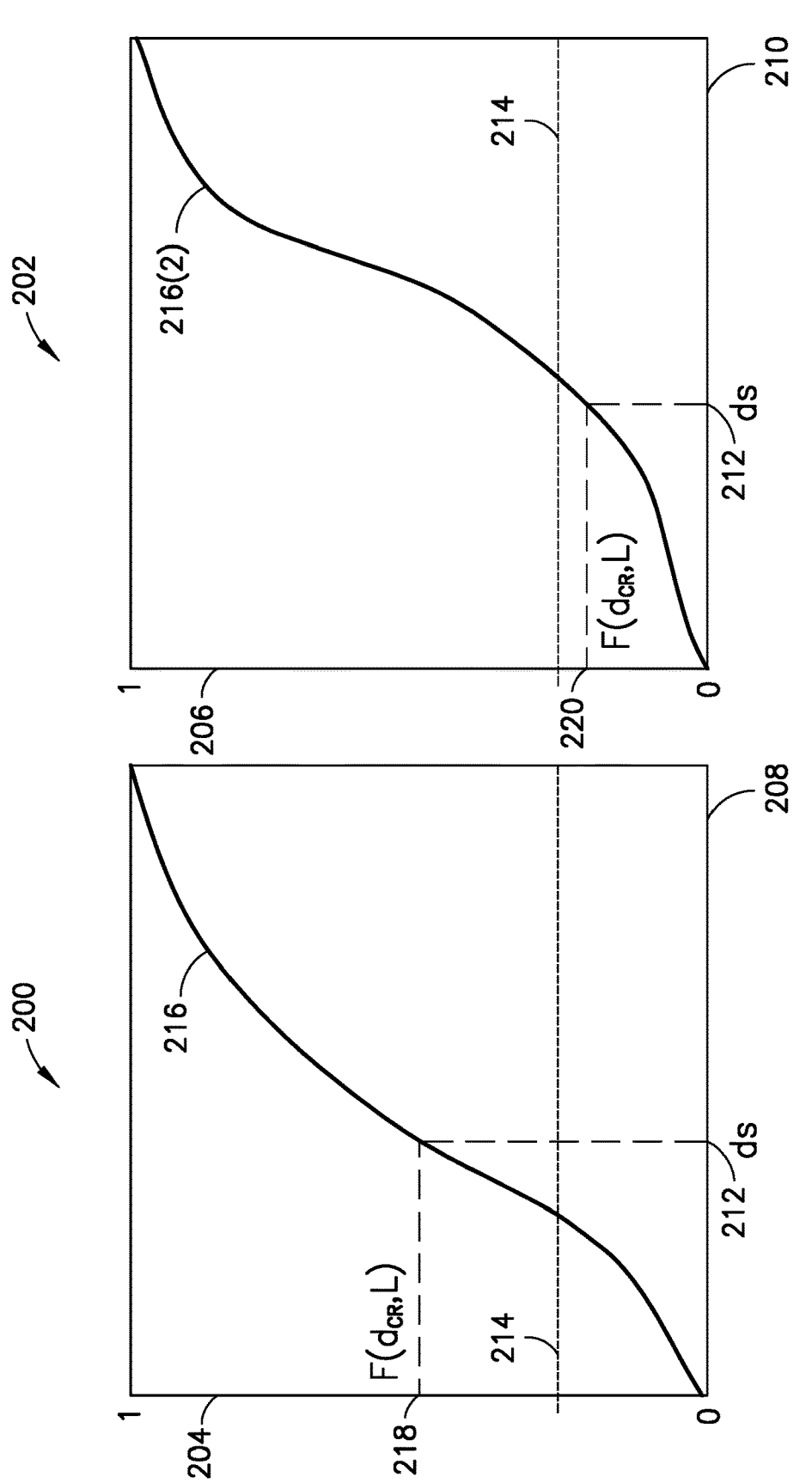
FIG. 2 illustrates various relationships between errors in water holdup detection, droplet diameter and volume fraction of emulsified water in accordance with embodiments of the subject disclosure.

FIG. 2 illustrates various relationships between errors in water holdup detection, droplet diameter and volume fraction of emulsified water in accordance with embodiments of the subject disclosure. Charts 200 and 202 have y-axes 204, 206 respectively, denoting volume fraction of emulsified water (vol/vol), and x-axes 208, 210, respectively, denoting droplet 108 diameter, d in nanometers.

Charts 200, 202 illustrate example performance scenarios associated with a measurement tool 106 having a known operational sensitivity 212, such as, for example, 200 nanometers and a preset threshold 214 of estimated error in the water holdup as measured by measurement tool 106, which might be acceptable to a well operator.

As shown in chart 200, given the operational sensitivity 212 (a.k.a. $d_s$) of measurement tool 106, the performance curve 216 corresponding to $F(d_s, L)$ shows that a large volume fraction of emulsified water 218 can be predicted to be present in wellbore 102 in the form of droplets 108 with a diameter less than the operational sensitivity 212 of measurement tool 106. The predicted volume fraction 218 can be expected to result in an error greater than preset threshold 214 of estimated error in the water holdup as expected to be measured by measurement tool 106. As a consequence, the error in the estimated water holdup expected to be measured by measurement tool 106 will be unacceptably large and a recommendation can be generated to deploy both measurement tool 106 and a second measurement tool (such as a pulsed neutron logging tool) to perform logging in borehole 102.

Chart 202 illustrates another scenario in which the performance curve 216(2) corresponding to $F(d_s, L)$ predicts that a small volume fraction of emulsified water 220 can be expected to be present in wellbore 102 in the form of droplets 108 with a diameter less than the operational sensitivity 212 of measurement tool 106. The predicted volume fraction 220 will result in an error less than preset threshold 214 of estimated error in the water holdup expected to be measured by measurement tool 106. As a consequence, the error in the estimated water holdup expected to be measured by measurement tool 106 will be acceptably small and a recommendation can be generated to use measurement tool 106 on its own to perform logging in borehole 102.

In one possible implementation, since the difference between densities of water and oil is small, in production flows in wellbore 102 characterized by intensive turbulence, droplets 108 can be assumed to be uniformly dispersed over a cross-section of wellbore 102, and the relative droplet-continuous fluid velocity can be viewed as negligibly small. Thus, in such an implementation, the approaches described herein can be equally applicable to both vertical and horizontal flows (such as, for example, when wellbore 102 is vertical, horizontal or any combination thereof).

It will be noted that a variety of information associated with properties of well environment 100 and/or fluid flow in wellbore 102 may be utilized in performing the various calculations described herein. This can include information associated with, for example, one or more wellbore properties such as an inner diameter of wellbore 102, and the proposed location of measurement tool 106 in wellbore 102 (including a distance of measurement tool 106 from an emulsion source 112 in wellbore 102). The information can also include one or more well fluid properties associated with fluids in wellbore 102, including, for example, production (flow) rate in wellbore 102, estimated water cut of fluids entering wellbore 102 from formation 104, density and viscosity versus pressure and temperature of fluids in wellbore 102, bottomhole pressure and bottomhole temperature in wellbore 102, asphaltene content and asphaltene onset precipitation pressure present in fluids flowing in wellbore 102, the presence and amount of natural, manmade and/or artificial chemicals (such as, for example, surfactants and/or surface active materials, flow back chemicals from a previous intervention, such as drill muds, fracking fluids, etc.) in fluids flowing in wellbore 102 that can suppress coalescence of water droplets, interfacial tensions between fluids in wellbore 102 and/or between the fluids and wellbore 102, bubble point pressure in wellbore 102, etc.

Information associated with properties of well environment 100 and/or fluid flow in wellbore 102 can be accessed in any of a variety of ways known in the art. For example, some information can be discerned from the equipment in use in well environment 100 (such as for example the inner diameter of wellbore 102). Other information can be discerned from empirical results of fluids and other materials taken from wellbore 102 and/or wellbores in the vicinity of wellbore 102. Such empirical results can come from laboratory trials run on the fluids at the surface, and/or measurements from any downhole equipment known in the art, including for example, wireline equipment, logging-while-drilling equipment, measuring-while-drilling equipment, sensors permanently or semi-permanently installed downhole, etc.

In addition, the various calculations described herein can be conducted in one or more computing devices at any known locations in the art, including, for example, at a surface logging and control system, in portable computing devices (including handheld devices), at a remote control center, etc.

Example Computing Device(s)

Figure 3:
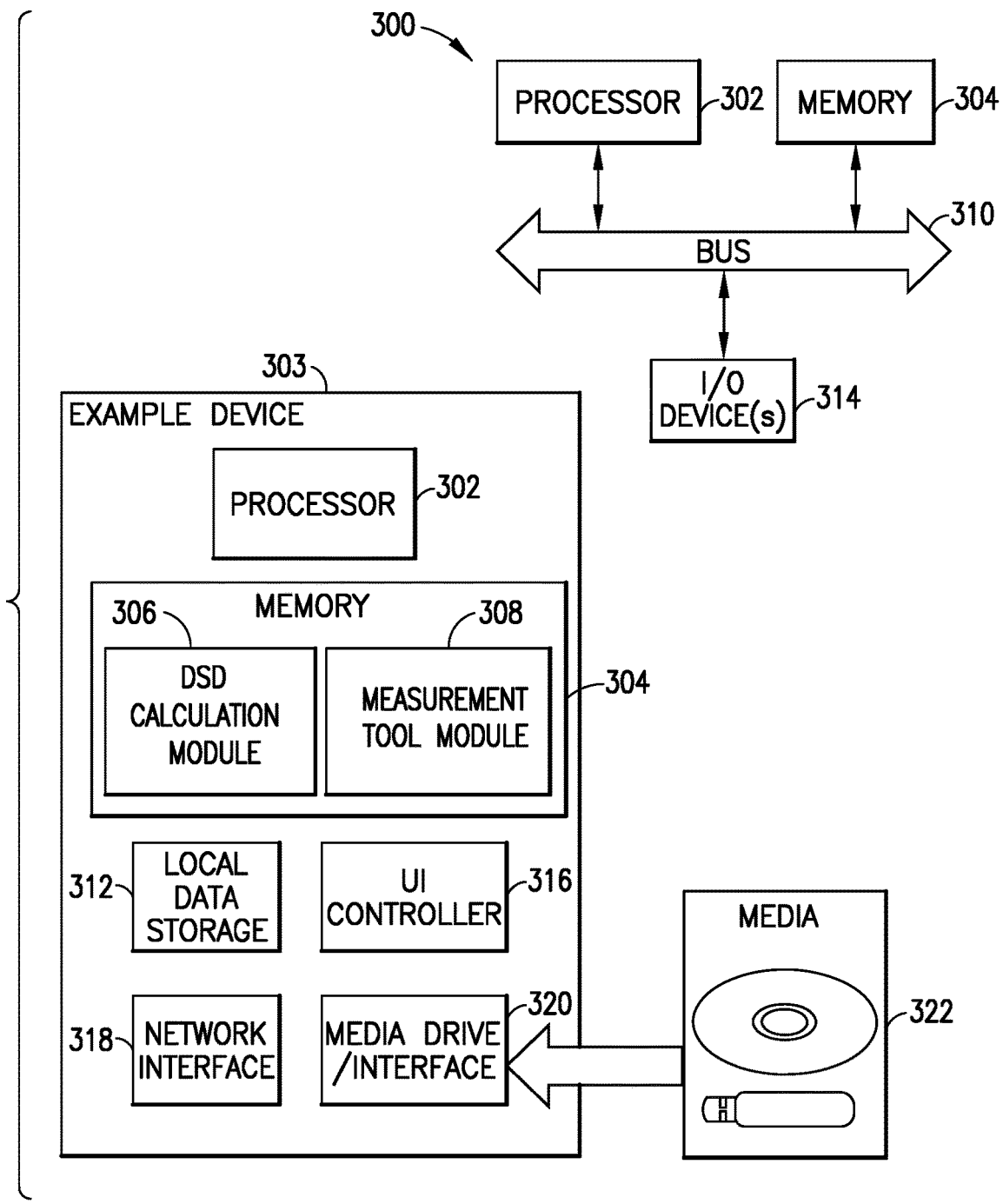
FIG. 3 illustrates an example computing device which can be used in conjunction with various embodiments.

FIG. 3 illustrates an example device 300, with a processor 302 and memory 304 for hosting a droplet size distribution (DSD) calculation module 306 and a measurement tool module 308 configured to implement various embodiments of measurement tool as discussed in this disclosure.

Memory 304 can also host one or more databases and can include one or more forms of volatile data storage media such as random access memory (RAM), and/or one or more forms of nonvolatile storage media (such as read-only memory (ROM), flash memory, and so forth).

Device 300 is one example of a computing device or programmable device, and is not intended to suggest any limitation as to scope of use or functionality of device 300 and/or its possible architectures. For example, device 300 can comprise one or more computing devices, programmable logic controllers (PLCs), etc.

Further, device 300 should not be interpreted as having any dependency relating to one or a combination of components illustrated in device 300. For example, device 300 may include one or more of a computer, such as a laptop computer, a desktop computer, a mainframe computer, etc., or any combination or accumulation thereof.

Device 300 can also include a bus 310 configured to allow various components and devices, such as processors 302, memory 304, and local data storage 312, among other components, to communicate with each other.

Bus 310 can include one or more of any of several types of bus structures, including a memory bus or memory controller, a peripheral bus, an accelerated graphics port, and a processor or local bus using any of a variety of bus architectures. Bus 310 can also include wired and/or wireless buses.

Local data storage 312 can include fixed media (e.g., RAM, ROM, a fixed hard drive, etc.) as well as removable media (e.g., a flash memory drive, a removable hard drive, optical disks, magnetic disks, and so forth).

One or more input/output (I/O) device(s) 314 may also communicate via a user interface (UI) controller 316, which may connect with I/O device(s) 314 either directly or through bus 310.

In one possible implementation, a network interface 318 may communicate outside of device 300 via a connected network, and in some implementations may communicate with hardware, such as measurement tool 106, etc.

In one possible embodiment, measurement tool 106 may communicate with device 300 as input/output device(s) 314 via bus 310, such as via a USB port, for example.

A media drive/interface 320 can accept removable tangible media 322, such as flash drives, optical disks, removable hard drives, software products, etc. In one possible implementation, logic, computing instructions, and/or software programs comprising elements of DSD calculation module 306 and measurement tool module 308 may reside on removable media 322 readable by media drive/interface 320.

In one possible embodiment, input/output device(s) 314 can allow a user to enter commands and information to device 300, and also allow information to be presented to the user and/or other components or devices. Examples of input device(s) 314 include, for example, sensors, a keyboard, a cursor control device (e.g., a mouse), a microphone, a scanner, and any other input devices known in the art. Examples of output devices include a display device (e.g., a monitor or projector), speakers, a printer, a network card, and so on.

Various processes of DSD calculation module 306 and measurement tool module 308 may be described herein in the general context of software or program modules, or the techniques and modules may be implemented in pure computing hardware. Software generally includes routines, programs, objects, components, data structures, and so forth that perform particular tasks or implement particular abstract data types. An implementation of these modules and techniques may be stored on or transmitted across some form of tangible computer-readable media. Computer-readable media can be any available data storage medium or media that is tangible and can be accessed by a computing device. Computer readable media may thus comprise computer storage media. "Computer storage media" designates tangible media, and includes volatile and non-volatile, removable and non-removable tangible media implemented for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information, and which can be accessed by a computer.

In one possible implementation, device 300, or a plurality thereof, can be employed at well environment 100. This can include, for example, in various equipment, such as in measurement tool 106, and in various surface equipment, such as a logging and control system, various handheld, portable and desktop devices operated by well operators, etc. Additionally, device 300, or a plurality thereof, can be employed remote from well environment 100, such as at a remote control center, etc.

Example Methods

FIGS. 4-7 illustrate example methods for implementing aspects of the subject disclosure. The methods are illustrated as a collection of blocks and other elements in a logical flow graph representing a sequence of operations that can be implemented in hardware, software, firmware, various logic or any combination thereof. The order in which the methods are described is not intended to be construed as a limitation, and any number of the described method blocks can be combined in any order to implement the methods, or alternate methods. Additionally, individual blocks and/or elements may be deleted from the methods without departing from the subject matter described therein. In the context of software, the blocks and other elements can represent computer instructions that, when executed by one or more processors, perform the recited operations. Moreover, for discussion purposes, and not for purposes of limitation, selected aspects of the methods may be described with reference to elements shown in FIGS. 1-3. Moreover, all or portions of the methods may, at least partially, be conducted using, for example, computing device 300.

Figure 4:
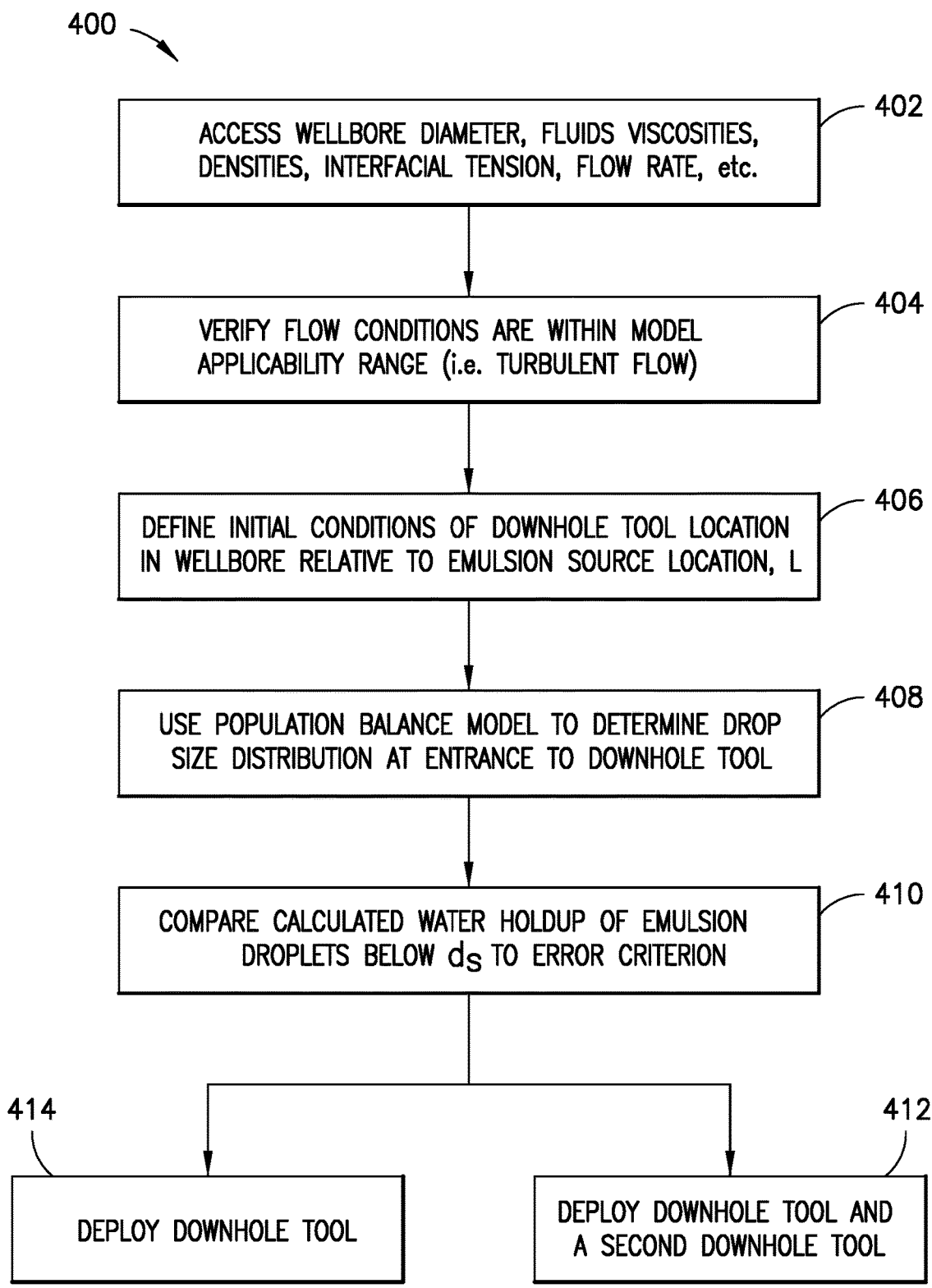
FIG. 4 illustrates an example method associated with embodiments of the subject disclosure.

FIG. 4 illustrates an example method 400 associated with embodiments of the subject disclosure. At block 402 various properties associated with a well environment, such as well environment 100, are accessed. These can include for example, wellbore properties, such as a diameter of a wellbore being used (102), as well as well fluid properties, including, for example, viscosities, densities, various interfacial tensions, flow rates, etc., of fluids flowing in the wellbore. These properties can be accessed by looking at known properties associated with the wellbore and by accessing results of tests and/or measurements run on well fluids collected at the wellbore, or nearby wells. The tests and/or measurements can be conducted using any methods and equipment known in the art, including downhole equipment and/or surface laboratories.

At block 404, flow conditions in the wellbore in the proximity of where a measurement tool, such as measurement tool 106, is proposed to be located are examined to confirm that turbulent flow exists such that Population Balance Modeling can be utilized to model aspects of fluid flow in the wellbore. Turbulent flow can exist, for example, when the wellbore is part of a high rate well. In such an instance, both the breakup and the coalescence processes for droplets, such as droplets 108, in the fluid flow in the wellbore can be driven by turbulence.

At block 406, the proposed location (such as location L in FIG. 1) of the measurement tool relative to the position of an emulsion source, such as emulsion source 112, in the wellbore can be accessed and/or defined.

At block 408, a Population Balance Model is created to determine, for example, drop size distribution of droplets of water, such as droplets 108, at an entrance (such as inlet 110) to the measurement tool. In one possible implementation, the Population Balance Model can be formulated, at least in part, using the wellbore properties and/or well fluid properties accessed in block 402 and/or the locations of the measurement tool and emulsion source established in block 406.

For example, as a result of the solution of Eq. 1, the droplet size distribution at the inlet of the measurement tool, located at a distance L (such as element 116 in FIG. 1) from the emulsion generation cross-section can be obtained. In one possible aspect, the solution can be represented as the integral droplet size distribution by volume F(d, L) averaged over the cross-section of the wellbore characterized by the axial coordinate x=L (where x=0 at the outlet of the emulsion source and x=L at the inlet of the measurement tool). The function F(d, L) can thus be used to determine a volume fraction of droplets, the sizes of which are smaller than d. Thus, if the droplet size indicating the operational sensitivity (i.e. the resolution minimum) $d_s$ for the measurement tool is introduced, then the error of the water holdup detection in measurement tool caused by smallness of water droplets 108 can be estimated to be equal to $F(d_s, L)$.

In one possible implementation, one or more of the actions in block 408 can be computed by, for example, DSD calculation module 306.

At block 410, the expected error of water holdup of emulsion droplets as expected to be measured by the measurement tool can be compared to a preset threshold (such as preset threshold 214) of estimated error in the water holdup that might be acceptable to a well operator. If the expected error is above the preset threshold, the error in the estimated water holdup expected to be measured by the measurement tool will be unacceptably large, and at block 412 a recommendation can be generated to deploy both the measurement tool and a second measurement tool (such as a pulsed neutron logging tool) to perform logging in the borehole. If the expected error is below the preset threshold, the error in the estimated water holdup expected to be measured by the measurement tool will be acceptably small and at block 414 a recommendation can be generated to deploy the measurement tool on its own to perform logging in the borehole.

In one possible implementation, some or all of the actions in block 410 can be done using, for example, measurement tool module 308.

Figure 5:
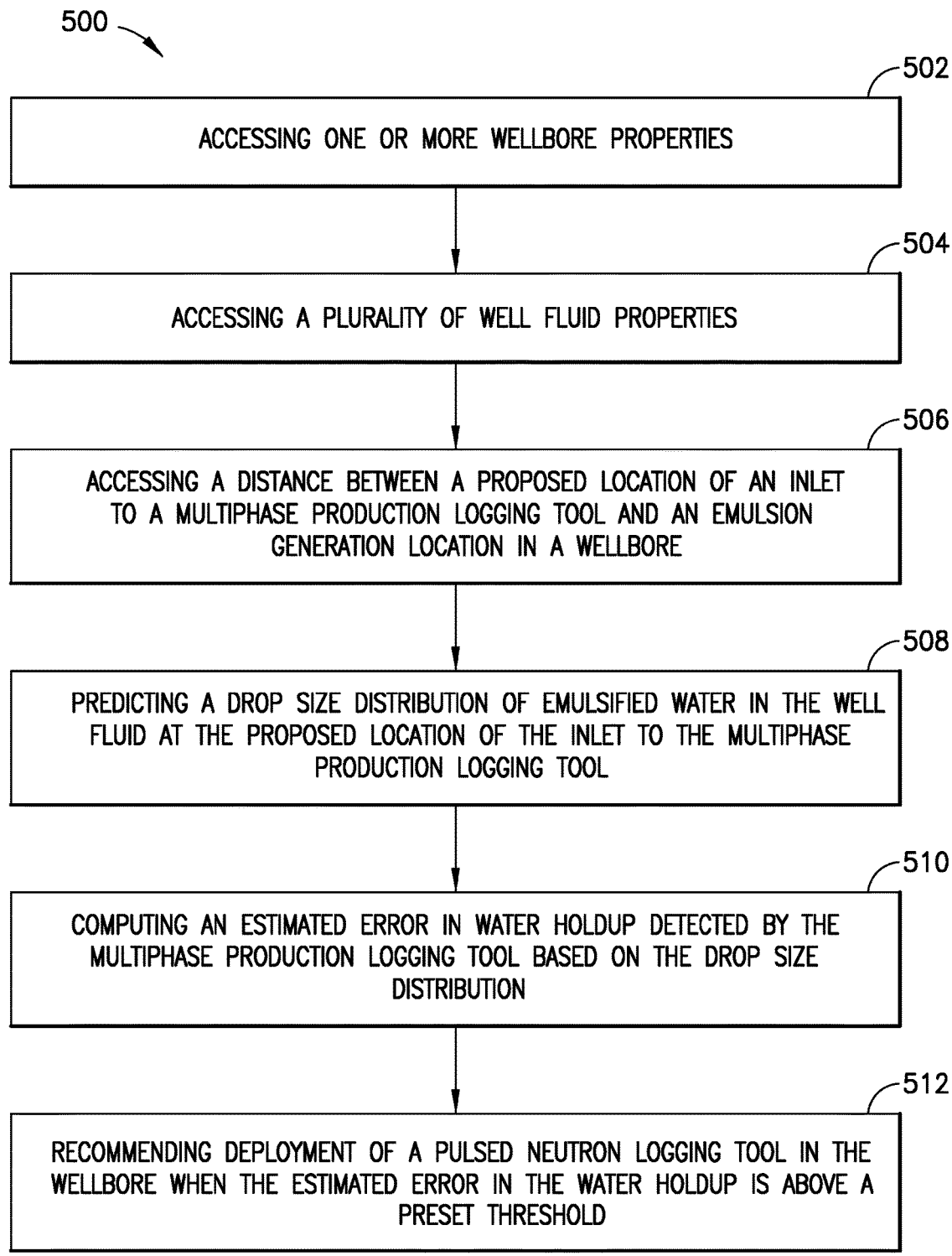
FIG. 5 illustrates an example method associated with embodiments of the subject disclosure.

FIG. 5 illustrates another example method 500 associated with embodiments of the subject disclosure. At block 502, one or more wellbore properties are accessed, such as an inner diameter of a wellbore 102.

At block 504, a plurality of well fluid properties are accessed. Well fluid properties can include one or more of: production (flow) rate in the wellbore, estimated water cut of fluids entering the wellbore from a formation (such as formation 104), density and viscosity versus pressure and temperature for fluids in the wellbore, bottomhole pressure and bottomhole temperature in the wellbore, asphaltene content and asphaltene onset precipitation pressure present in fluids flowing in the wellbore, the presence and amount of natural, manmade and/or artificial chemicals (such as, for example, surfactants and/or surface active materials, flow back chemicals from a previous intervention, such as drill muds, fracking fluids, etc.) in fluids flowing in the wellbore capable of suppressing coalescence of water droplets, interfacial tensions between fluids in the wellbore and/or between the fluids and the wellbore, bubble point pressure in the wellbore, etc.

In one possible implementation, the one or more wellbore properties in block 502 and the plurality of well fluid properties in block 504 can be accessed in any of a variety of ways known in the art. For example, some of the properties can be discerned from the equipment in use in the well environment in which the wellbore is found. Other properties can be discerned from empirical results of fluids and other materials taken from the wellbore and/or other wellbores in the vicinity of the wellbore. Such empirical results can come from laboratory trials run on the fluids at the surface, and/or measurements from any downhole equipment known in the art, including for example, wireline equipment, logging-while-drilling equipment, measuring-while-drilling equipment, sensors permanently or semi-permanently installed downhole, etc.

At block 506, a distance (such as distance L 116) between a proposed location of an inlet (such as inlet 110) to a multiphase production logging tool, such as measurement tool 106, and an emulsion generation location, such as a location of emulsion source 112, in the wellbore can be accessed. In one possible implementation, some or all of the information in block 506 can be accessed from a well operator's plan to place the multiphase production logging tool in the wellbore.

At block 508, a drop size distribution of emulsified water in droplets, such as droplets 108, in the well fluid at the proposed location of the inlet to the multiphase production logging tool can be predicted. In one possible implementation, this can be accomplished using, for example, Population Balance Modeling as described herein.

At block 510 an estimated error in water holdup detected by the multiphase production logging tool based on the drop size distribution is computed. For example, in one possible implementation, as a result of the solution of Eq. 1, the droplet size distribution at the inlet of the multiphase production logging tool, located at a distance L (such as element 116 in FIG. 1) from the emulsion generation cross-section (such as for example, at emulsion source 112) can be obtained. In one possible aspect, the solution can be represented as the integral droplet size distribution by volume F(d, L) averaged over the cross-section of the wellbore characterized by the axial coordinate x=L (where x=0 at the outlet of emulsion source and x=L at the inlet of multiphase production logging tool). The function F(d, L) can thus be used to determine a volume fraction of droplets, the sizes of which are smaller than d. Thus, if the droplet size indicating the operational sensitivity (i.e. the resolution minimum) $d_s$ for multiphase production logging tool is introduced, then the error of the water holdup detection in multiphase production logging tool caused by the smallness of water droplets 108 can be estimated to be equal to $F(d_s, L)$.

In one possible implementation, some or all of the actions in block 510 can be done using, for example, DSD calculation module 306 and/or measurement tool module 308.

At block 512 deployment of a pulsed neutron logging tool in the wellbore is recommended when the estimated error in the water holdup as expected to be measured by the multiphase production logging tool is above a preset threshold. In one possible implementation, the preset threshold is a value set by a well operator corresponding to an amount of error which the well operator can tolerate in the measurement of water holdup in the wellbore.

In one possible implementation, some or all of the actions in block 512 can be done using, for example, measurement tool module 308.

Figure 6:
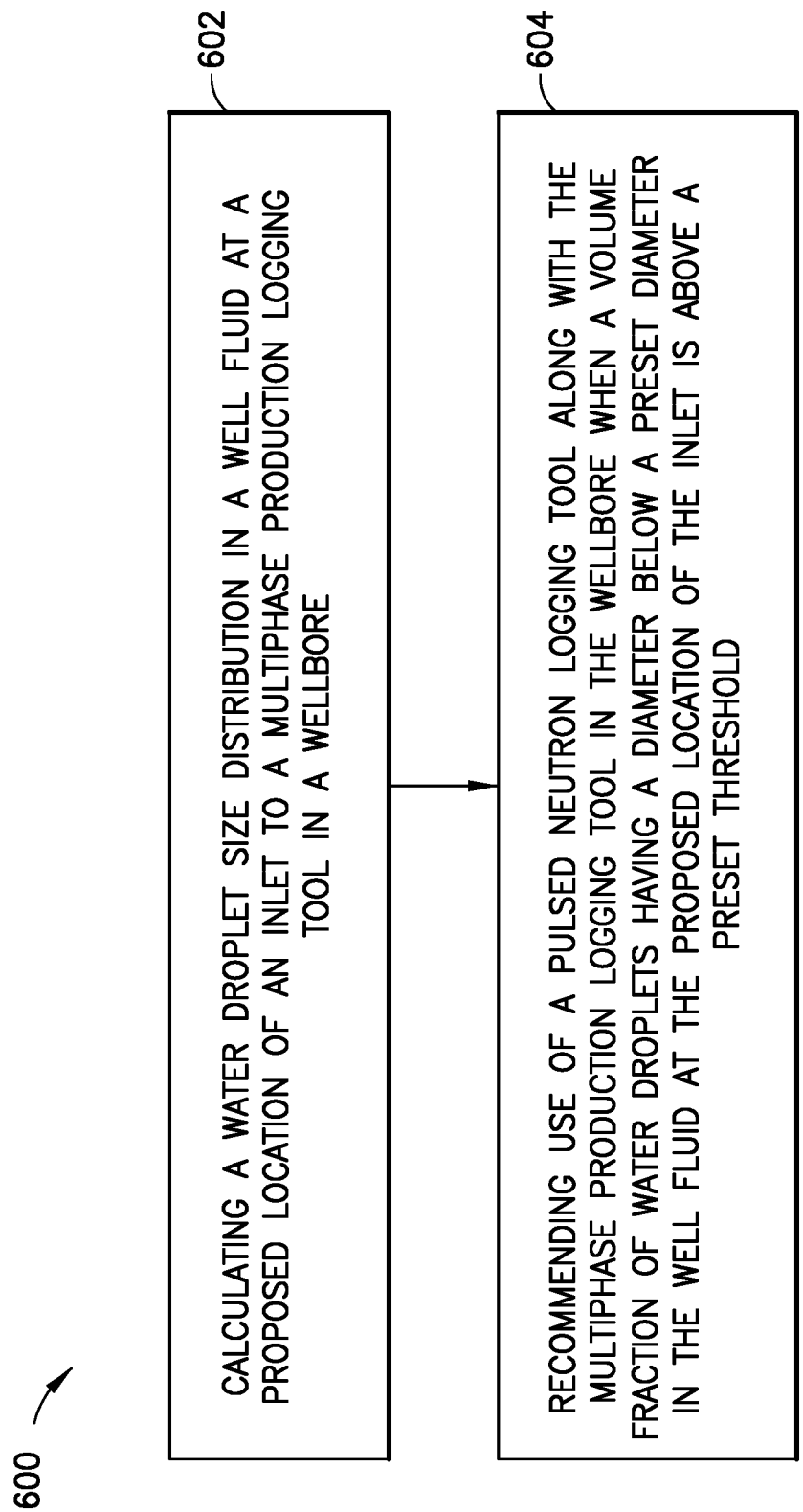
FIG. 6 illustrates an example method associated with embodiments of the subject disclosure.

FIG. 6 illustrates yet another example method 600 associated with embodiments of the subject disclosure. At block 602, a water droplet size distribution of droplets, such as droplets 108, in a fluid, such as a well fluid, at a proposed location of an inlet (such as inlet 110) to a multiphase production logging tool (such as measurement tool 106) in a conduit (such as wellbore 102) is calculated.

For example, in one possible implementation, as a result of the solution of Eq. 1, the droplet size distribution at the inlet of the multiphase production logging tool, located at a distance L (such as element 116 in FIG. 1) from the emulsion generation cross-section (such as for example, at emulsion source 112) can be obtained. In one possible aspect, the solution can be represented as the integral droplet size distribution by volume F(d, L) averaged over the cross-section of the conduit characterized by the axial coordinate x=L (where x=0 at the outlet of emulsion source and x=L at the inlet of multiphase production logging tool). The function F(d, L) can thus be used to determine a volume fraction of droplets, the sizes of which are smaller than d. Thus, if the droplet size indicating the operational sensitivity (i.e. the resolution minimum) $d_s$ for multiphase production logging tool is introduced, then the error of the water holdup detection in multiphase production logging tool caused by the smallness of water droplets can be estimated to be equal to $F(d_s, L)$.

In one possible implementation, some or all of the actions in block 602 can be done using, for example, DSD calculation module 306 and/or measurement tool module 308.

At block 604, use of a pulsed neutron logging tool can be recommended along with the multiphase production logging tool in the conduit when a volume fraction of water droplets having a diameter below a preset diameter in the well fluid at the proposed location of the inlet is above a preset threshold. In one possible implementation, the preset diameter can correspond to diameter $d_s$ associated with the operational sensitivity, such as operational sensitivity 212 of the multiphase production logging tool. The preset threshold can correspond to a value set by an operator, such as a well operator, indicating an amount of error which the well operator can tolerate in the measurement of water holdup in the conduit. In one possible implementation, the preset threshold can correspond to a volume fraction of water droplets having a diameter below a preset diameter in the well fluid, which can result in an expected measurement error by the multiphase production logging tool that the well operator can tolerate in the measurement of water holdup in the conduit.

In one possible implementation, some or all of the actions in block 604 can be done using, for example, measurement tool module 308.

Figure 7:
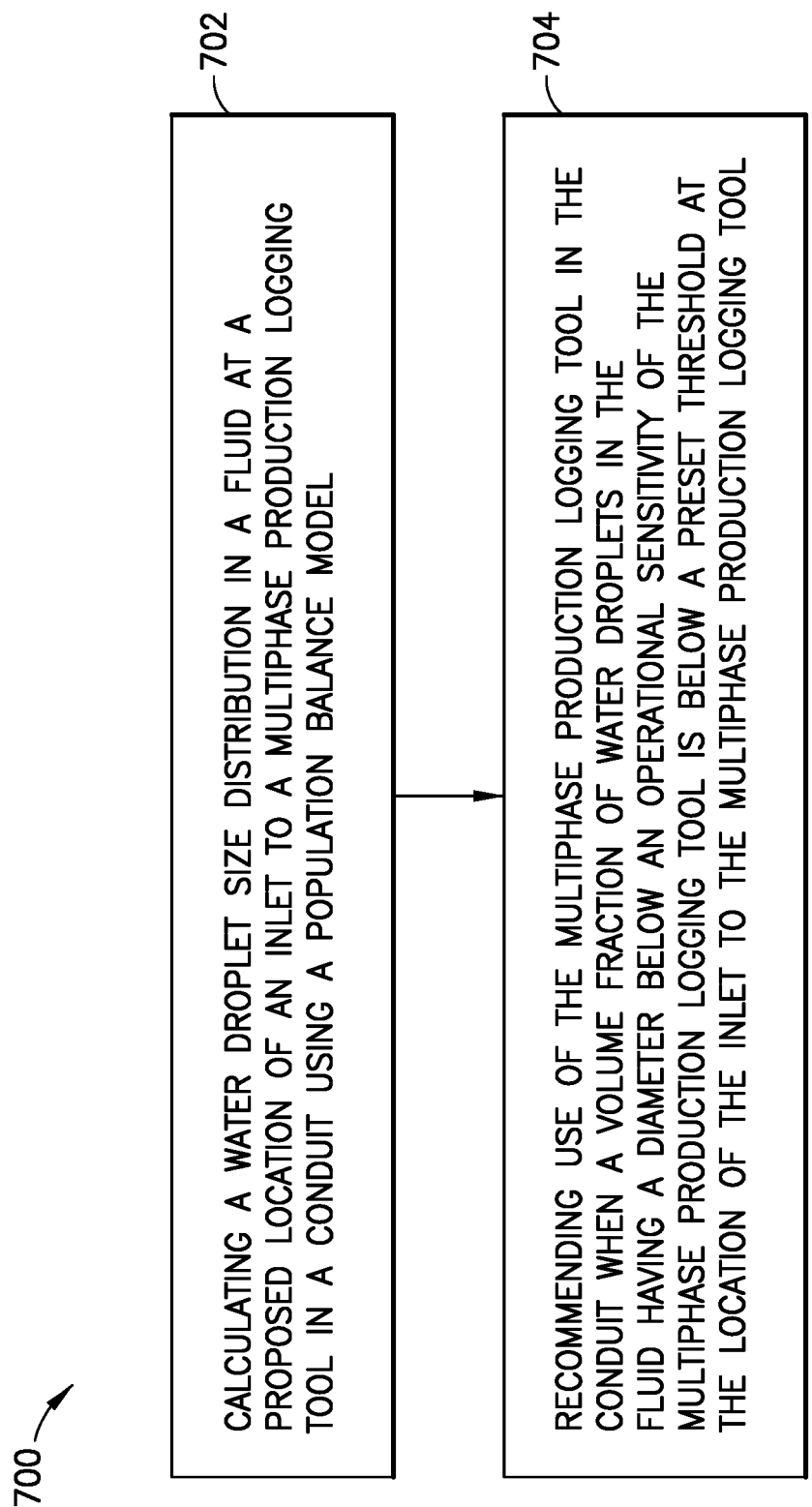
FIG. 7 illustrates an example method associated with embodiments of the subject disclosure.

FIG. 7 illustrates still another example method 700 associated with embodiments of the subject disclosure. At block 702, a water droplet size distribution of droplets, such as droplets 108, in a fluid, such as a well fluid, at a proposed location of an inlet, such as inlet 110, to a multiphase production logging tool, such as measurement tool 106, in a conduit, such as wellbore 102, is calculated using a Population Balance Model. In one possible implementation, the Population Balance Model is calculated in accordance with the methods described herein.

In one possible implementation, some or all of the actions in block 702 can be done using, for example, DSD calculation module 306 and/or measurement tool module 308.

At block 704, use of the multiphase production logging tool on its own in the conduit can be recommended when a volume fraction of water droplets in the well fluid having a diameter below an operational sensitivity, such as operational sensitivity 212 of the multiphase production logging tool is below a preset threshold at the location of the inlet to the multiphase production logging tool.

In one possible implementation, the operational sensitivity of the multiphase production logging tool can correspond to diameter $d_s$ and the preset threshold can correspond to a value set by an operator, such as a well operator indicating an amount of error which the well operator can tolerate in the measurement of water holdup in the conduit. In one possible embodiment, the preset threshold can correspond to a volume fraction of water droplets having a diameter below a preset diameter in the well fluid, which can result in an expected measurement error by the multiphase production logging tool that the well operator can tolerate in the measurement of water holdup in the conduit.

In one possible implementation, some or all of the actions in block 704 can be done using, for example, measurement tool module 308.

Although a few example embodiments have been described in detail above, those skilled in the art will readily appreciate that many modifications are possible in the example embodiments without materially departing from this disclosure. Accordingly, such modifications are intended to be included within the scope of this disclosure as defined in the following claims. Moreover, embodiments may be performed in the absence of any component not explicitly described herein.

In the claims, means-plus-function clauses are intended to cover the structures described herein as performing the recited function and not just structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

The invention claimed is:

1. A computer-readable tangible medium with instructions stored thereon that, when executed, direct a processor to perform acts comprising:
   accessing one or more wellbore properties;
   accessing a plurality of well fluid properties;
   accessing a distance between a proposed location of an inlet to a multiphase production logging tool and an emulsion generation location in a wellbore;
   predicting a drop size distribution of emulsified water in the well fluid at the proposed location of the inlet to the multiphase production logging tool based on the one or more wellbore properties, the plurality of well fluid properties, and the distance between a proposed location of an inlet to a multiphase production logging tool and an emulsion generation location in a wellbore;
   computing an estimated error in water holdup detected by the multiphase production logging tool based on the drop size distribution; and
   recommending deployment of a pulsed neutron logging tool in the wellbore when the estimated error in the water holdup is above a preset threshold.

2. The computer-readable medium of claim 1, further including instructions to direct a processor to perform acts comprising:
   accessing the one or more wellbore properties by accessing an inner diameter of the wellbore.

3. The computer-readable medium of claim 1, further including instructions to direct a processor to perform acts comprising:
   accessing the plurality of well fluid properties by accessing one or more of:
   a water cut associated with the well fluid;
   density and viscosity versus pressure and temperature of oil in the well fluid;
   interfacial tension between fluids comprising the well fluid;
   surface active materials associated with the well fluid;
   asphaltene content in the well fluid;
   bottomhole pressure in the wellbore;
   bottomhole temperature in the wellbore;
   asphaltene onset precipitation pressure in the well fluid; and
   a flow rate of the well fluid in the wellbore.

4. The computer-readable medium of claim 1, further including instructions to direct a processor to perform acts comprising:
   accessing a distance between a proposed location of an inlet to a multiphase production logging tool and an emulsion generation location in the wellbore by determining a distance between the proposed location of the inlet to the multiphase production logging tool and one or more of:
   an outlet of an artificial lift pump;
   a face of a reservoir through which the wellbore has been drilled; and
   a completion element in the wellbore.

5. The computer-readable medium of claim 1, further including instructions to direct a processor to perform acts comprising:
   predicting the drop size distribution of emulsified water in the well fluid at the proposed location of the inlet to the multiphase production logging tool through population balance modeling.

6. The computer-readable medium of claim 5, further including instructions to direct a processor to perform acts comprising:
   utilizing a birth rate function B based at least partially on results from testing of the well fluid.

7. The computer-readable medium of claim 5, further including instructions to direct a processor to perform acts comprising:
   utilizing a death rate function D based at least partially on results from testing of the well fluid.

8. The computer-readable medium of claim 1, further including instructions to direct a processor to perform acts comprising:
   computing the estimated error based at least partially on an operational sensitivity of the multiphase production logging tool.

9. The computer-readable medium of claim 8, further including instructions to direct a processor to perform acts comprising:
   confirming that the well fluid in the wellbore is undergoing turbulent flow at the proposed location of the inlet to the multiphase production logging tool.

10. A computer-readable tangible medium with instructions stored thereon that, when executed, direct a processor to perform acts comprising:
    calculating a water droplet size distribution in a well fluid at a proposed location of an inlet to a multiphase production logging tool in a wellbore; and
    recommending use of a pulsed neutron logging tool along with the multiphase production logging tool in the wellbore when a volume fraction of water droplets having a diameter below a preset diameter in the well fluid at the proposed location of the inlet is above a preset threshold.

11. The computer-readable medium of claim 10, further including instructions to direct a processor to perform acts comprising:
calculating the water droplet size distribution through use of a population balance model.

12. The computer-readable medium of claim 11, further including instructions to direct a processor to perform acts comprising:
calculating the water droplet size distribution at least partially through use of an advection-diffusion-population equation in a two-dimensional steady-state form comprising:

$$u(r)\frac{\partial N(v, x, r)}{\partial x} = \frac{1}{r}\frac{\partial rE(d, r)\frac{\partial N(v, x, r)}{\partial r}}{\partial r} + \left(\frac{dN(v, x, r)}{dt}\right)_{PB}.$$

13. The computer-readable medium of claim 10, further including instructions to direct a processor to perform acts comprising:
calculating the water droplet size distribution using a distance between the proposed location of an inlet to a multiphase production logging tool and an emulsion source comprising one or more of:
an outlet of an artificial lift pump;
a face of a reservoir through which the wellbore has been drilled; and
a completion element in the wellbore.

14. The computer-readable medium of claim 10, further including instructions to direct a processor to perform acts comprising:
identifying the preset diameter at least partially based on an operational sensitivity of the multiphase production logging tool.

15. The computer-readable medium of claim 10, further including instructions to direct a processor to perform acts comprising:
confirming that the well fluid in the wellbore is undergoing turbulent flow at the proposed location of the inlet to the multiphase production logging tool.

16. A computing device including a computer-readable tangible medium with instructions stored thereon that, when executed, direct a processor to perform acts comprising:
calculating a water droplet size distribution in a well fluid at a proposed location of an inlet to a multiphase production logging tool in a wellbore using a population balance model; and
recommending use of the multiphase production logging tool in the wellbore when a volume fraction of water droplets in the well fluid having a diameter below an operational sensitivity of the multiphase production logging tool determined from the calculated water droplet size distribution is below a preset threshold at the location of the inlet to the multiphase production logging tool.

17. The computing device of claim 16, wherein the computer-readable medium further includes instructions to direct a processor to perform acts comprising:
calculating the water droplet size distribution at least partially through use of an advection-diffusion-population equation in a two-dimensional steady-state form comprising:

$$u(r)\frac{\partial N(v, x, r)}{\partial x} = \frac{1}{r}\frac{\partial rE(d, r)\frac{\partial N(v, x, r)}{\partial r}}{\partial r} + \left(\frac{dN(v, x, r)}{dt}\right)_{PB}.$$

18. The computing device of claim 16, wherein the computer-readable medium further includes instructions to direct a processor to perform acts comprising:
calculating the water droplet size distribution using a distance between the proposed location of an inlet to a multiphase production logging tool and an emulsion source comprising one or more of:
an outlet of an artificial lift pump;
a face of a reservoir through which the wellbore has been drilled; and
a completion element in the wellbore.

19. The computing device of claim 16, wherein the computer-readable medium further includes instructions to direct a processor to perform acts comprising:
recommending use of a pulsed neutron logging tool along with the multiphase production logging tool in the wellbore when a volume fraction of water droplets in the well fluid having a diameter below an operational sensitivity of the multiphase production logging tool is above the preset threshold at the location of the inlet to the multiphase production logging tool.

20. A method, comprising:
accessing one or more wellbore properties;
accessing a plurality of well fluid properties;
accessing a distance between a proposed location of an inlet to a multiphase production logging tool and an emulsion generation location in a wellbore;
predicting a drop size distribution of emulsified water in the well fluid at the proposed location of the inlet to the multiphase production logging tool based on the one or more wellbore properties, the plurality of well fluid properties, and the distance between a proposed location of an inlet to a multiphase production logging tool and an emulsion generation location in a wellbore;
computing an estimated error in water holdup detected by the multiphase production logging tool based on the drop size distribution; and
deploying a pulsed neutron logging tool in the wellbore when the estimated error in the water holdup is above a preset threshold.

* * * * *